(12) United States Patent
Koorapaty et al.

(10) Patent No.: US 10,609,545 B2
(45) Date of Patent: Mar. 31, 2020

(54) DISCOVERY CARRIERS IN FREQUENCY-HOPPING IOT SYSTEMS

(71) Applicant: TELEFONAKTIEBOLAGET L M ERICSSON (PUBL), Stockholm (SE)

(72) Inventors: Havish Koorapaty, Saratoga, CA (US); Yi-Pin Eric Wang, Fremont, CA (US); Amitav Mukherjee, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/327,792

(22) PCT Filed: Nov. 21, 2017

(86) PCT No.: PCT/IB2017/057306
§ 371 (c)(1),
(2) Date: Feb. 22, 2019

(87) PCT Pub. No.: WO2018/092116
PCT Pub. Date: May 24, 2018

(65) Prior Publication Data
US 2019/0239059 A1  Aug. 1, 2019

Related U.S. Application Data

(60) Provisional application No. 62/425,057, filed on Nov. 21, 2016.

(51) Int. Cl.
*H04W 8/00* (2009.01)
*H04J 11/00* (2006.01)
(Continued)

(52) U.S. Cl.
CPC .......... *H04W 8/005* (2013.01); *H04B 1/7143* (2013.01); *H04J 11/0069* (2013.01);
(Continued)

(58) Field of Classification Search
CPC ... H04W 8/005; H04W 24/10; H04W 56/001; H04W 4/80; H04W 4/70; H04W 16/14; H04B 1/1743
See application file for complete search history.

(56) References Cited

U.S. PATENT DOCUMENTS 6,690,939 B1 * 2/2004 Jonsson ................ H04W 36/18
370/331
2015/0173011 A1 * 6/2015 Das ........................ H04W 16/26
370/328
(Continued)

OTHER PUBLICATIONS

Qualcomm Incorporated, "PUSCH Design Options", 3GPP TSG RAN WG1 Meeting #83, R1-157023, Nov. 15, 2015.
(Continued)

*Primary Examiner* — Anez C Ebrahim

(57) ABSTRACT

According to some embodiments, a method for use in a wireless device of acquiring system information in a frequency-hopping network comprises obtaining an indication that the wireless device is configured for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. The method further comprises tuning a radio receiver of the wireless device to the discovery channel, and acquiring system information using the one or more dense discovery signals. For example, a discovery signal (e.g. NPSS, NSSS, NPBCH, etc.) of the non-discovery channel may include one occurrence per frame and the corresponding discovery signal of the discovery channel includes more than one occurrence per frame.

16 Claims, 11 Drawing Sheets

600

612: obtain an indication that a wireless device is configured for frequency hopping among a plurality of frequency channels, wherein at least one of the plurality of frequency channels is a discovery channel

↓

614: tune a radio receiver of the wireless device to the discovery channel

↓

616: acquire system information using the one or more dense discovery signals

(51) Int. Cl.

| | |
|---|---|
| *H04W 4/70* | (2018.01) |
| *H04W 4/80* | (2018.01) |
| *H04B 1/7143* | (2011.01) |
| *H04W 16/14* | (2009.01) |
| *H04W 24/10* | (2009.01) |
| *H04W 56/00* | (2009.01) |

(52) U.S. Cl.
CPC ............... *H04W 4/70* (2018.02); *H04W 4/80* (2018.02); *H04W 16/14* (2013.01); *H04W 24/10* (2013.01); *H04W 56/001* (2013.01)

(56) References Cited

U.S. PATENT DOCUMENTS

| | | | |
|---|---|---|---|
| 2016/0234762 A1 | 8/2016 | You et al. | |
| 2016/0374080 A1* | 12/2016 | Wei | H04W 74/0833 |
| 2017/0013574 A1* | 1/2017 | Zhu | H04W 48/08 |
| 2018/0338319 A1* | 11/2018 | Kim | H04W 76/14 |

OTHER PUBLICATIONS

NTT Docomo, "Details on PUSCH for low complexity MTC", 3GPP TSG RAN WG1 Meeting #82bis, R1-155926, Oct. 4, 2015.

* cited by examiner

DISCOVERY CARRIERS IN FREQUENCY-HOPPING IOT SYSTEMS

RELATED APPLICATIONS

This application is a national stage application of International Patent Application No. PCT/IB2017/057306, filed Nov. 21, 2017, which claims the benefit of U.S. provisional patent application Ser. No. 62/425,057, filed Nov. 21, 2016, the disclosures of which are hereby incorporated herein by reference in their entirety.

TECHNICAL FIELD

Certain embodiments of the present disclosure relate, in general, to wireless communications and, more particularly, to discovery carriers in frequency-hopping (FH) Internet-of-Things (IoT) systems. Certain embodiments may relate to the technology areas of IoT, narrowband IoT (NB-IoT), machine-type communications (MTC), unlicensed bands, frequency-hopping, MuLTEfire, or Third Generation Partnership Project (3GPP) Release (Rel.) 15.

INTRODUCTION

The Internet of Things (IoT) is a vision for the future world where everything that can benefit from a connection will be connected. Cellular technologies are being developed or evolved to play an indispensable role in the IoT world, particularly the machine type communication (MTC). MTC is characterized by lower demands on data rates than, for example, mobile broadband, but with higher requirements on, for example, low cost device design, better coverage, and an ability to operate for years on batteries without charging or replacing the batteries.

To meet the IoT design objectives, the Third Generation Partnership Project (3GPP) has standardized narrowband IoT (NB-IoT) in long term evolution (LTE) Release 13 to include a system bandwidth of 180 kHz and targets improved coverage, long battery life, low complexity communication design, and network capacity that is sufficient for supporting a massive number of devices.

Further improvements to the market impact of NB-IoT and enhanced MTC may include extending their deployment mode to unlicensed band operation. For example, the 915 MHz band in the US and the global 2.4 GHz Industrial, Scientific and Medical (ISM) bands may be candidates. An unlicensed band, however, is associated with specific regulations to ensure that different systems can co-exist in the band with good performance and fairness. Compliance with the regulations requires particular modifications to Rel-13 eMTC and NB-IoT equipment.

In the aforementioned bands, using frequency-hopping (FH) so that a transmitter can transmit at a higher power level without power spectral density (PSD) limitation or requiring listen-to-talk (LBT) is beneficial. When frequency-hopping is used, a user equipment (UE) needs to learn the hopping pattern used by the eNB controlling the cell before the UE can start actual communication. Detecting primary and secondary synchronization sequences (PSS and SSS) is a first step in acquiring the cell hopping pattern, together with or followed by decoding master and system information blocks (MIB/SIBs) to perform initial access.

For example, frequency-hopping IoT systems may include the following steps for the initial cell acquisition process: (a) synchronize to PSS, which includes identifying frame boundary and cell id within a group, and correct frequency offset; (b) synchronize to SSS, which includes identifying the physical cell id (PCID) and finding the hopping pattern; (c) acquire MIB via physical broadcast channel (PBCH) based on the hopping pattern derived from SSS, and if the found SSS if from other operator, then the wrong hopping pattern may be used to find PBCH, which results a failure in acquiring MIB and the UE goes back to PSS stage, else the UE acquires SIB1 scheduling from the MIB; and (d) acquire SIB1 and other SIBs.

SUMMARY

Certain embodiments include methods that speed up initial cell acquisition for frequency-hopping Internet-of-Things (IoT) systems. Particular embodiments configure a set of downlink channels or hops as discovery channels or hops, which have a higher density of synchronization signals and/or reference signals compared with other, regular hops.

Certain embodiments are presented in recognition of shortcomings or challenges associated with conventional approaches, such as the following. Initial cell acquisition for frequency-hopping IoT systems is complicated by the fact that a user equipment (UE) does not have a priori information regarding the current hops on which the cell that the UE is trying to acquire is transmitting. This can lead to long delays in initial cell synchronization and acquisition of system information. If a UE detection window for synchronization sequences and reference signals overlaps partially with a cell hop, then the UE may need to wait for multiple hops to finish cell acquisition, which also slows down the process.

According to some embodiments, a method for use in a wireless device of acquiring system information in a frequency-hopping network comprises obtaining an indication that the wireless device is configured for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. The method further comprises tuning a radio receiver of the wireless device to the discovery channel, and acquiring system information using the one or more dense discovery signals.

In particular embodiments, obtaining the indication that the wireless device is configured for frequency hopping comprises the wireless device being preconfigured for frequency hopping.

In particular embodiments, obtaining the indication that the wireless device is configured for frequency hopping comprises receiving an indication of a frequency hopping pattern of a neighbor cell. The frequency hopping pattern of the neighbor cell includes at least one discovery channel. The method further comprises configuring one or more measurement gaps that coincide with the at least one discovery channel of the neighbor cell. Acquiring system information using the one or more dense discovery signals comprises measuring a signal quality of at least one of the one or more dense discovery signals of the neighbor cell during one of the one or more measurement gaps.

In particular embodiments, the method further comprises receiving a synchronization offset of the neighbor cell. Configuring the one or more measurement gaps is based on the received synchronization offset of the neighbor cell.

In particular embodiments, the one or more discovery signals include at least one of a synchronization signal (SS), reference signal (RS), physical broadcast channel (PBCH), and a system information (SI). For example, the wireless device may comprise a narrowband Internet-of-Things (NB-IoT) device, and the one or more SS includes at least one of a narrowband primary synchronization signal (NPSS) and a narrowband secondary synchronization signal (NSSS), and the at least one PBCH includes a narrowband physical broadcast channel (NPBCH). The wireless device may comprise an enhanced machine type communication (eMTC) device, and the one or more SS includes at least one of a primary synchronization signal (PSS) and a secondary synchronization signal (SSS).

In particular embodiments, at least one discovery signal of the discovery channel is twice as dense as a corresponding discovery signal of the non-discovery channels. A discovery signal of the non-discovery channel may include one occurrence per frame and the corresponding discovery signal of the discovery channel includes more than one occurrence per frame.

According to some embodiments, a wireless device is capable of acquiring system information in a frequency-hopping network. The wireless device comprises processing circuitry operable to obtain an indication that the wireless device is configured for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. The processing circuitry is further operable to tune a radio receiver of the wireless device to the discovery channel, and acquire system information using the one or more dense discovery signals.

In particular embodiments, the processing circuitry is operable to obtain the indication that the wireless device is configured for frequency hopping by obtaining a preconfiguration of the wireless device for frequency hopping.

In particular embodiments, the processing circuitry is operable to obtain the indication that the wireless device is configured for frequency hopping by receiving an indication of a frequency hopping pattern of a neighbor cell. The frequency hopping pattern of the neighbor cell includes at least one discovery channel. The processing circuitry is further operable to configure one or more measurement gaps that coincide with the at least one discovery channel of the neighbor cell, and acquire system information using the one or more dense discovery signals by measuring a signal quality of at least one of the one or more dense discovery signals of the neighbor cell during one of the one or more measurement gaps. The processing circuitry may be further operable to receive a synchronization offset of the neighbor cell, and configure the one or more measurement gaps based on the received synchronization offset of the neighbor cell.

In particular embodiments, the one or more discovery signals include at least one of a SS, RS, PBCH, and a SI. For example, the wireless device may comprise a NB-IoT device, and the one or more SS includes at least one of a NPSS and a NSSS, and the at least one PBCH includes a NPBCH. The wireless device may comprise an eMTC device, and the one or more SS includes at least one of PSS and a SSS.

In particular embodiments, at least one discovery signal of the discovery channel is twice as dense as a corresponding discovery signal of the non-discovery channels. A discovery signal of the non-discovery channel may include one occurrence per frame and the corresponding discovery signal of the discovery channel includes more than one occurrence per frame.

According to some embodiments, a method for use in a network node of providing system information in a frequency-hopping network comprises obtaining a frequency hopping pattern for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. The method further comprises transmitting discovery signals according to the obtained frequency-hopping pattern.

In particular embodiments, the method comprises transmitting the frequency hopping pattern to a wireless device (e.g., for performing neighbor cell measurements). The method may further comprise transmitting a synchronization offset of a neighbor cell to the wireless device. Transmitting the frequency hopping pattern may comprise transmitting at least one of a cell identity and a network identity.

In particular embodiments, the one or more discovery signals include at least one of a SS, RS, PBCH, and a SI. For example, the wireless device may comprise a NB-IoT device, and the one or more SS includes at least one of a NPSS and a NSSS, and the at least one PBCH includes a NPBCH. The wireless device may comprise an eMTC device, and the one or more SS includes at least one of PSS and a SSS.

In particular embodiments, at least one discovery signal of the discovery channel is twice as dense as a corresponding discovery signal of the non-discovery channels. A discovery signal of the non-discovery channel may include one occurrence per frame and the corresponding discovery signal of the discovery channel includes more than one occurrence per frame.

According to some embodiments, a network node is capable of providing system information in a frequency-hopping network. The network node comprises processing circuitry operable to obtain a frequency hopping pattern for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. The processing circuitry is further operable to transmit discovery signals according to the obtained frequency-hopping pattern.

In particular embodiments, the processing circuitry is further operable to transmit the frequency hopping pattern to a wireless device. The processing circuitry may be further operable to transmit a synchronization offset of a neighbor cell to the wireless device. The processing circuitry may be operable to transmit the frequency hopping pattern by transmitting at least one of a cell identity and a network identity.

In particular embodiments, the one or more discovery signals include at least one of a SS, RS, PBCH, and a SI. For example, the wireless device may comprise a NB-IoT device, and the one or more SS includes at least one of a NPSS and a NSSS, and the at least one PBCH includes a NPBCH. The wireless device may comprise an eMTC device, and the one or more SS includes at least one of PSS and a SSS.

In particular embodiments, at least one discovery signal of the discovery channel is twice as dense as a corresponding discovery signal of the non-discovery channels. A discovery signal of the non-discovery channel may include one occurrence per frame and the corresponding discovery signal of the discovery channel includes more than one occurrence per frame.

According to some embodiments, a wireless device is capable of acquiring system information in a frequency-hopping network. The wireless device comprises an obtaining module and an acquiring module. The obtaining module is operable to obtain an indication that the wireless device is configured for frequency hopping among a plurality of frequency channels, wherein at least one of the plurality of frequency channels is a discovery channel. The acquiring module is operable to tune a radio receiver of the wireless device to the discovery channel, and acquire system information using the one or more dense discovery signals.

According to some embodiments, a network node is capable of providing system information in a frequency-hopping network. The network node comprises an obtaining module and a transmitting module. The obtaining module is operable to obtain a frequency hopping pattern for frequency hopping among a plurality of frequency channels, wherein at least one of the plurality of frequency channels is a discovery channel. The transmitting module is operable to transmit discovery signals according to the obtained frequency-hopping pattern.

Also disclosed is a computer program product. The computer program product comprises instructions stored on non-transient computer-readable media which, when executed by a processor, perform the steps of: obtaining an indication that the wireless device is configured for frequency hopping among a plurality of frequency channels and at least one of the plurality of frequency channels is a discovery channel; tuning a radio receiver of the wireless device to the discovery channel; and acquiring system information using the one or more dense discovery signals.

Another computer program product comprises instructions stored on non-transient computer-readable media which, when executed by a processor, perform the steps of: obtaining a frequency hopping pattern for frequency hopping among a plurality of frequency channels, wherein at least one of the plurality of frequency channels is a discovery channel; and transmitting discovery signals according to the obtained frequency-hopping pattern.

Certain embodiments of the present disclosure may provide one or more technical advantages. For example, in some embodiments the initial cell acquisition process may be faster, leading to quicker connection to the network. UE power consumption may be reduced in some embodiments. By limiting the number of hops on which the SS/RS density is increased, the system overhead may not increase significantly. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

As described in the Introduction, Third Generation Partnership Project (3GPP) networks such as long term evolution (LTE) and 5G new radio (NR) may include Narrowband Internet-of-Things (NB-IoT) devices and/or enhanced machine type communication (eMTC) devices, for example, that use frequency hopping in unlicensed spectrum. Initial cell acquisition for frequency-hopping systems is complicated by the fact that a user equipment (UE) does not have a priori information regarding the frequency hopping pattern for the cell that the UE is trying to acquire. This can lead to long delays in initial cell synchronization and acquisition of system information. If a UE detection window for synchronization sequences and reference signals overlaps partially with a cell hop, then the UE may need to wait for multiple hops to finish cell acquisition, which slows down the acquisition process.

Particular embodiments obviate the problems described above and speed up initial cell acquisition for frequency-hopping systems by configuring a set of downlink channels or hops as discovery channels or hops, which have a higher density of synchronization signals and/or reference signals compared with other, regular (non-discovery) hops.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Particular embodiments are described with reference to FIGS. 1-10B of the drawings, like numerals being used for like and corresponding parts of the various drawings. LTE and NR are used throughout this disclosure as example cellular systems, but the ideas presented herein may apply to other wireless communication systems as well.

Figure 1:
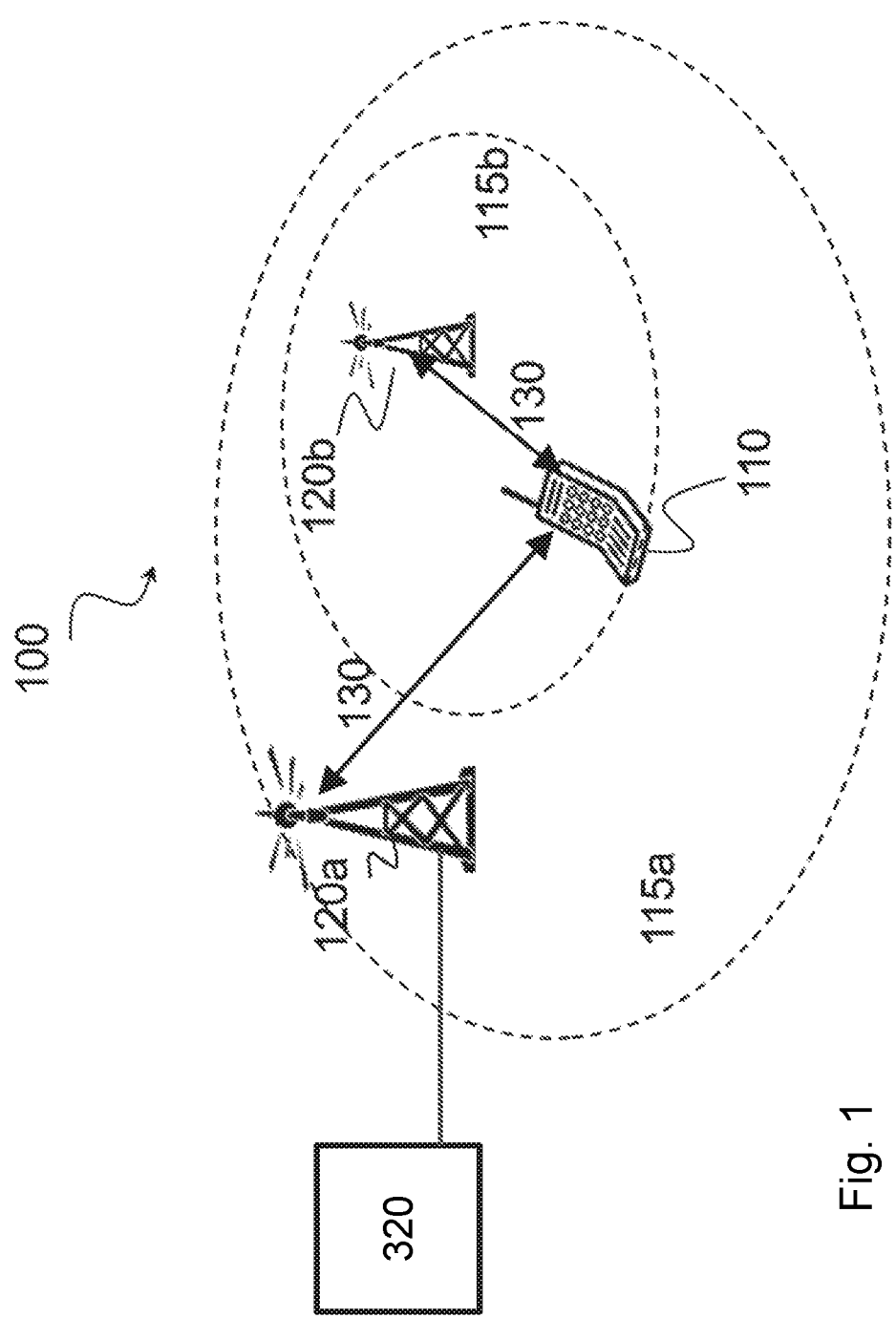
FIG. 1 is a block diagram illustrating an example wireless network, according to a particular embodiment.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110.

In some embodiments, wireless device 110 may be referred to by the non-limiting term "UE." A UE may include any type of wireless device capable of communicating with a network node or another UE over radio signals. The UE may comprise radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

In some embodiments, network node 120 may include any type of network node such as a base station, radio base station, base transceiver station, base station controller, network controller, evolved Node B (eNB), Node B, gNB, multi-RAT base station, Multi-cell/multicast Coordination Entity (MCE), relay node, access point, radio access point, Remote Radio Unit (RRU) Remote Radio Head (RRH), a core network node (e.g., MME, SON node, a coordinating node, etc.), or even an external node (e.g., 3rd party node, a node external to the current network), etc.

Wireless signals 130 may include both downlink transmissions (from radio network node 120 to wireless devices 110) and uplink transmissions (from wireless devices 110 to radio network node 120). Wireless signals 130 may include synchronization signals and reference signals in addition to data and control channels.

Each network node 120 may have a single transmitter or multiple transmitters for transmitting wireless signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Network 100 may include carrier aggregation. For example, wireless device 110 may be served by both network node 120a and 120b and communicate wireless signals 130 with both network node 120a and 120b.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform listen before talk (LBT) protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially, or may not overlap at all.

Network node 120 and wireless device 110 may avoid LBT protocols by using frequency hopping. In particular embodiments, the unlicensed spectrum may comprise a 2.4 GHz band divided into 160 frequency channels. A transmit power of the data transmission may be as high as 36 dBm. In particular embodiments, the unlicensed spectrum comprises a 915 MHz band divided into 50 frequency channels. A transmit power of the data transmission may be as high as 36 dBm.

According to some embodiments, wireless device 110 acquires system information in a frequency-hopping network. At least one of the plurality of frequency channels is a discovery channel. The discovery channel includes one or more dense discovery signals. A dense discovery signal is denser than a corresponding discovery signal included in the non-discovery channels of the plurality of frequency channels. To acquire system information, wireless device 110 may tune its radio receiver to the discovery channel and search for one or more dense discovery signals.

In particular embodiments, the one or more discovery signals include at least one of a synchronization signal (SS), reference signal (RS), physical broadcast channel (PBCH), and a system information (SI). For example, the wireless device may comprise a NB-IoT device, and the one or more SS includes at least one of a narrowband primary synchronization signal (NPSS) and a narrowband secondary synchronization signal (NSSS), and the at least one PBCH includes a narrowband physical broadcast channel (NPBCH). The wireless device may comprise an eMTC device, and the one or more SS includes at least one of a primary synchronization signal (PSS) and a secondary synchronization signal (SSS).

In particular embodiments, at least one discovery signal of the discovery channel is twice as dense as a corresponding discovery signal of the non-discovery channels. A discovery signal of the non-discovery channel may include one occurrence per frame and the corresponding discovery signal of the discovery channel includes more than one occurrence per frame.

In some embodiments, wireless device 110 may obtain a frequency hopping pattern of a neighbor cell. The frequency hopping pattern of the neighbor cell includes at least one discovery channel Wireless device 110 may configure one or more measurement gaps that coincide with the at least one discovery channel of the neighbor cell. Wireless device 110 may measure a signal quality of at least one of the one or more dense discovery signals of the neighbor cell during one of the one or more measurement gaps. Wireless device 110 may use the measurements in preparation for a handover. Wireless device 110 may receive a synchronization offset of the neighbor cell. Configuring the one or more measurement gaps may be based on the received synchronization offset of the neighbor cell (e.g., adjusting the gaps forward or backward in time to account for the offset). Additional details are described below with respect to FIGS. 2-7.

In certain embodiments, network nodes 125 may interface with a radio network controller (RNC). The radio network controller may control network nodes 120 and may provide certain radio resource management functions, mobility management functions, and/or other suitable functions. In certain embodiments, the functions of the radio network controller may be included in network node 120. The radio network controller may interface with a core network node (CN), such as core network node 320.

In certain embodiments, the radio network controller may interface with core network node 320 via an interconnecting wired or wireless network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 320 may manage the establishment of communication sessions and various other functionalities for wireless devices 110. Examples of core network node 320 may include mobile switching center (MSC), mobility management entity (MME), serving gateway (SGW), packet data network gateway (PGW), operation and maintenance (O&M), operations support system (OSS), SON, positioning node (e.g., Enhanced Serving Mobile Location Center, (E-SMLC)), MDT node, etc. Wireless devices 110 may exchange certain signals with core network node 320 using the non-access stratum layer. In non-access stratum signaling, signals between wireless devices 110 and core network node 320 may be transparently passed through the radio access network. In certain embodiments, network nodes 120 may interface with one or more network nodes 120 over an internode interface, such as, for example, an X2 interface.

In wireless network 100, each radio network node 120 may use any suitable radio access technology, such as long term evolution (LTE), LTE-Advanced, NR, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described below with respect to FIG. 8A. Similarly, a radio network node may include any suitable combination of hardware and/or software. For example, in particular embodiments, a network node, such as network node 120, may include the components described below with respect to FIG. 9A. A core network node may include any suitable combination of hardware and/or software. For example, in particular embodiments, a core network node, such as core network node 320, may include the components described below with respect to FIG. 10A.

Particular embodiments are described with respect to frequency hopping in NB-IoT and eMTC systems in the US 915 MHz band and the 2.4 GHz band in the US and in Europe. However, the general principle of discovery carriers or hops is applicable to any band. The frequency location and spacing of discovery hops may be predefined in the standard or in the UE.

In the US, FCC regulations require that a transmitter transmitting a signal of 20 dB bandwidth smaller than 250 kHz may use 36 dBm Equivalent Isotropically Radiated Power (EIRP) if hopping over 50 (or greater) and 75 (or greater) frequency channels in the 915 MHz and 2.4 GHz ISM bands, respectively (FCC Part 15, Section 247).

Figure 2:
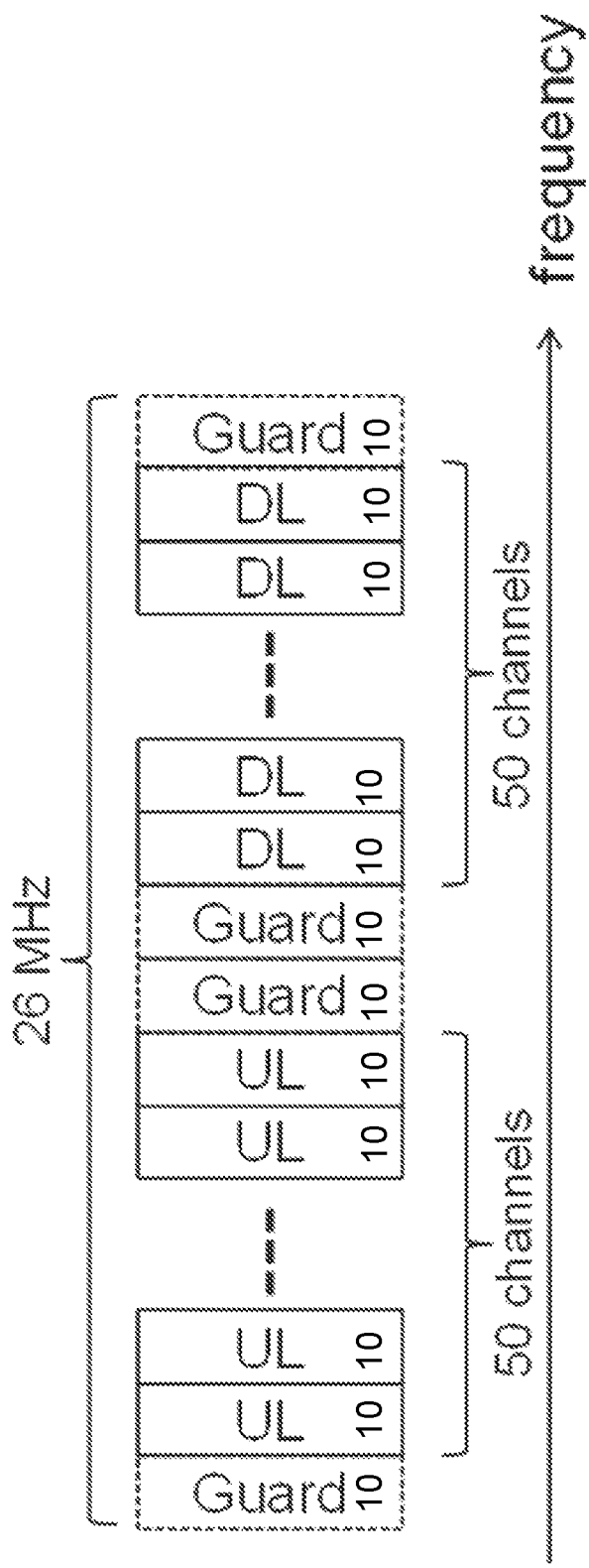
FIG. 2 is a block diagram illustrating an example channel definition suitable for NB-IoT in the US 902-928 MHz ISM band.

FIG. 2 is a block diagram illustrating an example channel definition suitable for NB-IoT in the US 902-928 MHz ISM band. The horizontal axis represents frequency. Each channel 10 occupies 250 kHz bandwidth. There are 50 uplink (UL) channels 10 and 50 downlink (DL) channels 10.

Figure 3:
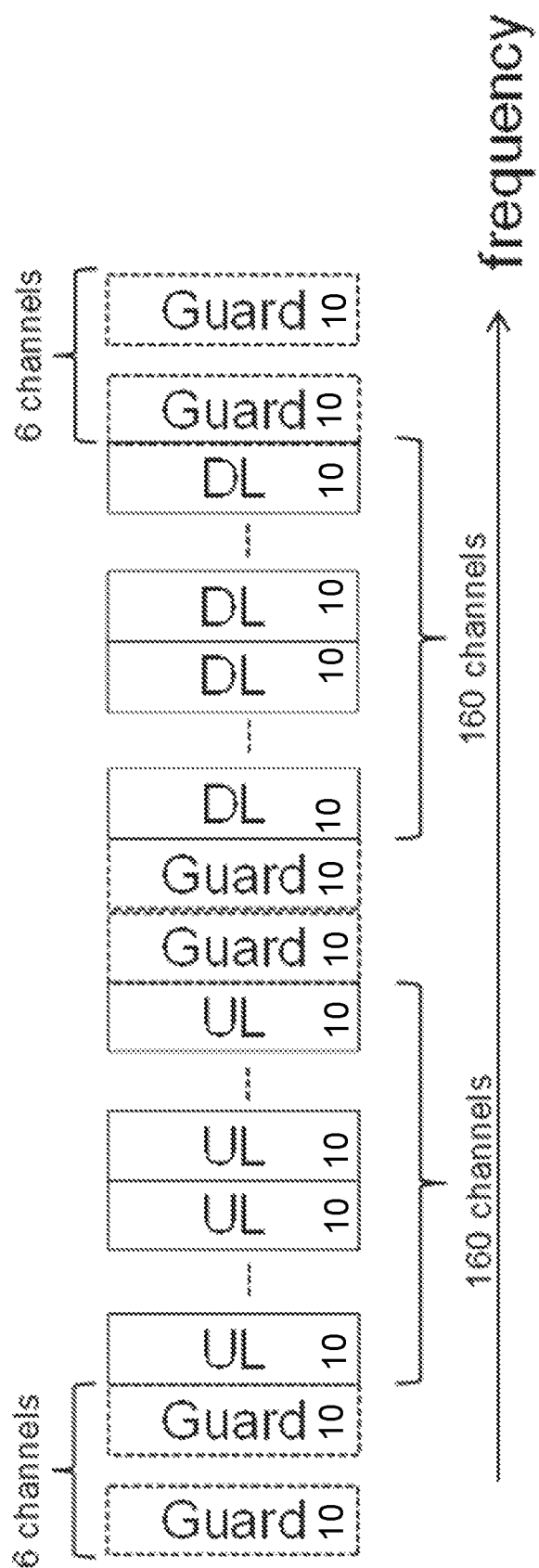
FIG. 3 is a block diagram illustrating an example channel definition suitable for NB-IoT in the US 2.4-2.4835 GHz ISM band.

FIG. 3 is a block diagram illustrating an example channel definition suitable for NB-IoT in the US 2.4-2.4835 GHz ISM band. The horizontal axis represents frequency. Each channel 10 occupies 250 kHz bandwidth. There are 160 uplink (UL) channels 10 and 160 downlink (DL) channels 10.

In the EU 2.4 GHz band, non-adaptive frequency-hopping over 12 (or greater) frequency channels allows 20 dBm EIRP with a medium utilization constraint of 10%, and a gap period of at least 5 ms and an accumulated transmit time limit of 15 ms per frequency or hop. The 83.5 MHz available in this band can therefore be used for a total of 59 channels or hops, for example. Each channel occupies 1.4 MHz bandwidth.

Figure 4:
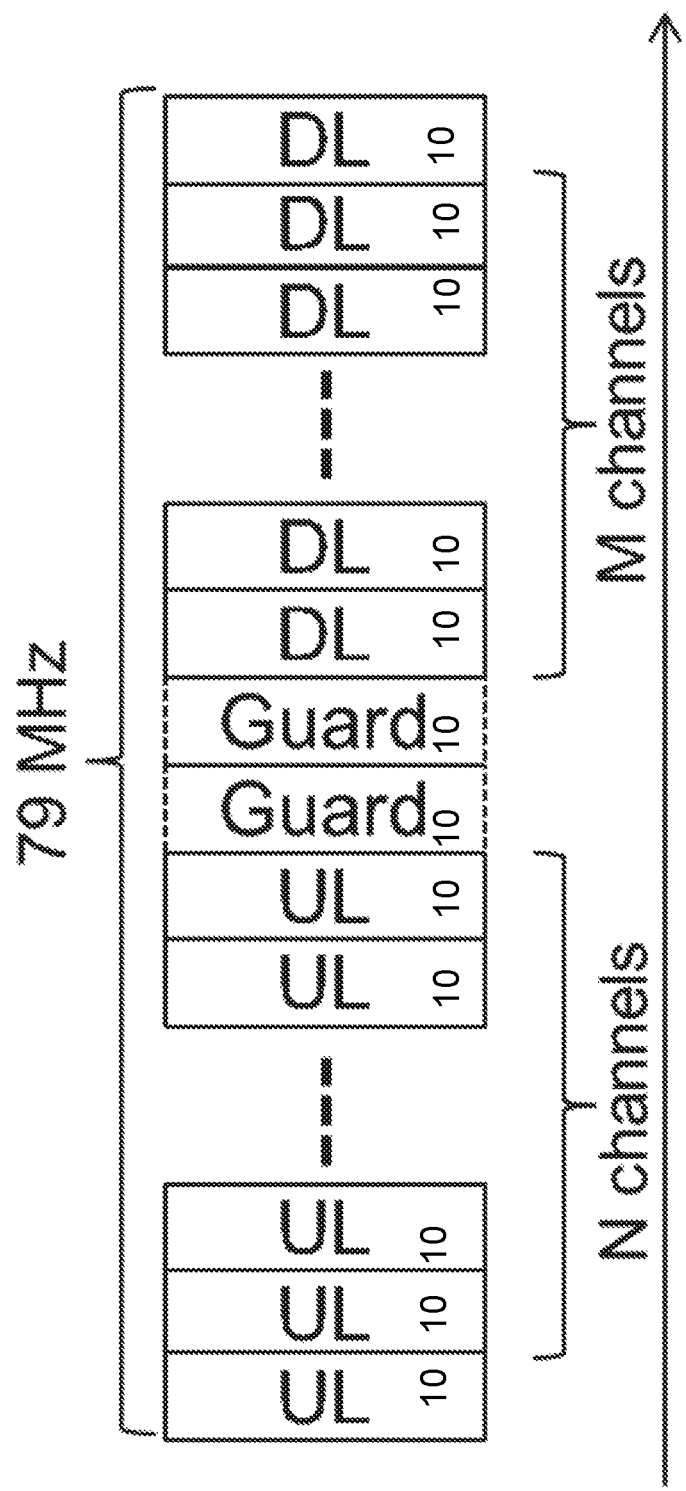
FIG. 4 is a block diagram illustrating an example eMTC-U channelization for US or EU 2.4 GHz.

FIG. 4 is a block diagram illustrating an example eMTC-U channelization for US or EU 2.4 GHz. The horizontal axis represents frequency.

With respect to particular embodiments, N refers to the number of hopping channels. The cell hopping pattern may be a repetitive one based on a pseudo random hopping pattern Q in a hopping cycle that consists of N hopping channels.

$$Q=(f_1, f_2, \ldots, f_N), f_i \in \{0, \ldots, N-1\}$$

where each hopping channel is represented by an integer from 0 to N−1.

To differentiate from Rel-13 NB-IoT or eMTC, the description of particular embodiments adds a suffix "U" when describing the version of NB-IoT or eMTC that is intended for unlicensed band operation.

In a first group of embodiment, discovery carriers are designed for NB-IoT-U, where the regular, or non-discovery, carriers retain the NB-IoT framing. Namely, out of the N available channels, D channels are designated as discovery carriers. These D channels feature a higher density of PSS/SSS and/or other RS and/or PBCH or SIB. A non-limiting example comparing discovery with regular hops is illustrated in FIGS. 5A and B.

Figure 5A:
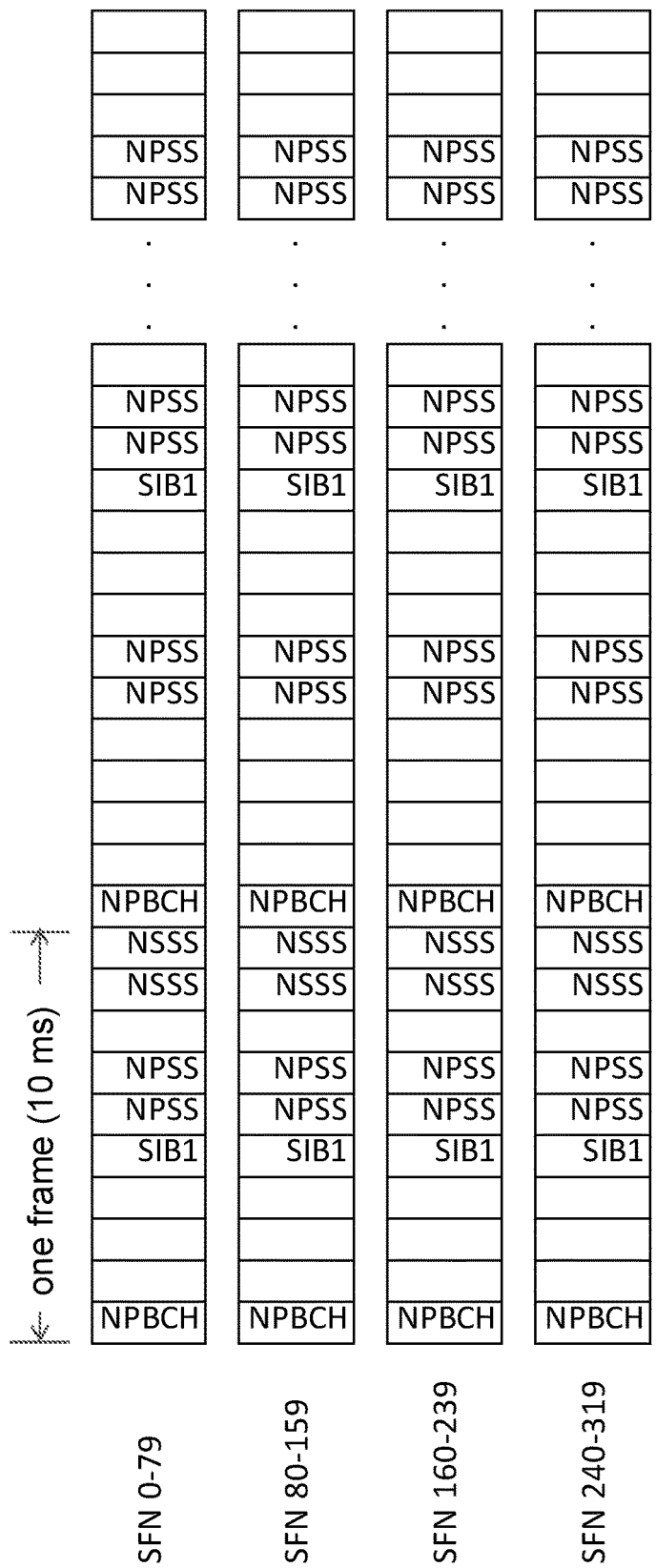
FIG. 5A is a block diagram illustrating an example frame structure for a discovery channel, according to a particular embodiment.

FIG. 5A is a block diagram illustrating an example frame structure for a discovery channel, according to a particular embodiment. The example illustrates synchronization or reference signal occurrences at particular subframes of a frame for a discovery channel.

Figure 5B:
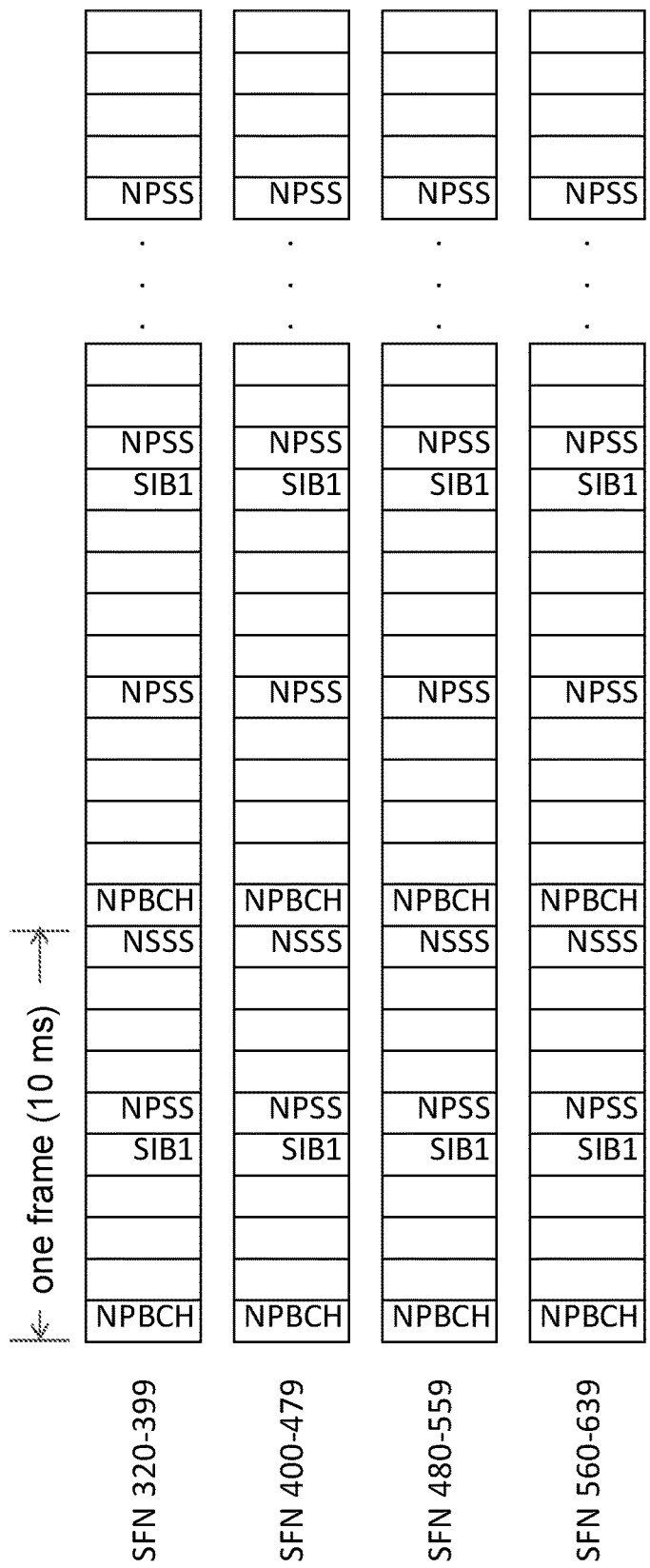
FIG. 5B is a block diagram illustrating an example frame structure for a non-discovery channel, according to a particular embodiment.

FIG. 5B is a block diagram illustrating an example frame structure for a non-discovery channel, according to a particular embodiment. The examples illustrates synchronization or reference signal occurrences at particular subframes of a frame for a non-discovery channel.

Hop f1 (i.e., FIG. 5A) denotes the discovery hop and hop f2 (i.e., FIG. 5B) is a regular hop. The discovery hop f1 has twice as many NPSS and NSSS symbols in the time domain compared to the regular hop f2 in the illustrated example. An eNB may transmit one discovery hop after every X regular hops, where $1 \leq X \leq N-1$.

In certain embodiments, a method of operating a radio access node (e.g., an eNB or gNB) configured for NB-IoT operation comprises transmitting one discovery hop after every X regular hops, where $1 \leq X \leq N-1$, wherein the discovery hop has a higher density (e.g., twice as many) of NPSS and NSSS symbols in the time domain compared to the regular hop. Such a method could be performed, for example, by operation of a radio access node 120 as illustrated in any of FIGS. 1, 7, 9A and 9B, where a processor may control the transmission of X regular hops via a transmitter, then transmission of the one discovery hop via the transmitter, and so on. Certain embodiments may also include an apparatus comprising features (e.g., modules, processor, transmitter, etc.) configured to perform such a method, such as those illustrated in FIGS. 9A and 9B, for example. Certain other embodiments may include a wireless communication device (e.g., as shown in any of FIGS. 1, 6, 8A and 8B) or related methods for communicating with a radio access node that uses the described scheme of regular hops and discovery hops.

In particular embodiments, the increase in NSSS density improves the NSSS detection performance of the UE, which in turn hastens the detection of the PCID-U of the cell and consequently the cell hopping pattern.

In another aspect of the example in FIGS. 5A and 5B, additional symbols may be allocated for NPBCH or SIB1 repetition on discovery channels. Although a particular number of symbols are illustrated, particular embodiments may include any suitable number where the discovery channel is denser than the non-discovery channels.

In a second group of embodiments, discovery carriers are designed for eMTC-U, with each hop spanning 1.4 MHz in frequency. The principle is the same as the previous embodiments. Namely, out of the N available channels, D channels are designated as discovery carriers. These D channels feature a higher density of PSS/SSS and/or other RS and/or PBCH or SIB.

In certain embodiments, a method of operating a radio access node configured for eMTC-U operation comprises designating or identifying D channels out of N available channels as discovery carriers, and transmitting PSS/SSS and/or other RS and/or PBCH on the D channels with higher (e.g., twice as high) density than the remaining N-D channels. Such a method could be performed, for example, by operation of a radio access node as illustrated in any of FIGS. 1, 7, 9A and 9B, where a processor may control the transmission of information via the D channels and the N-D channels via a transmitter. Certain embodiments may also include an apparatus comprising features (e.g., modules, processor, transmitter, etc.) configured to perform such a method, such as those illustrated in FIG. 6 or 7, for example. Certain other embodiments may include a wireless communication device (e.g., as shown in any of FIG. 1, 7A or 7B) or related methods (e.g., FIG. 6) for communicating with a radio access node that uses the described scheme of regular hops and discovery hops.

A third group of embodiments include mobility measurements. These embodiments include measurements on the discovery carriers of neighboring cells. The measurements are typically performed periodically when the UE is connected to its serving cell. The hopping patterns used for different cells may be different to avoid interference between the cells. This can make performing measurements on neighboring cells during a limited window of time (e.g., a few ms is typically required) quite challenging.

In these embodiments, both for NB-IOT-U and eMTC-U, the hopping patterns on neighboring cells can be signaled to the UE. In addition to the hopping pattern, Q, the UE may also be signaled information on whether the cells in the network are adequately (e.g., within some level of tolerance) synchronized. If they are not, the expected synchronization uncertainty may also be signaled. These two elements of information can provide the UE with enough information to perform measurements on a neighboring cell that is operating on the same carrier frequency or on different carrier frequencies.

In certain embodiments, a method of operating a radio access node comprises communicating (e.g., signaling, transmitting, etc.) hopping patterns of a neighboring cell(s) to a UE, and communicating information indicating whether cells in the network are adequately synchronized. In some embodiments, the method further comprises communicating an expected level of uncertainty in the synchronization if the cells are not adequately synchronized.

When operating on different carrier frequencies, typically a measurement gap is configured to the UE so that the UE may tune its receiver within the measurement gap to a different frequency and perform measurements. When such measurement gaps are used, in one aspect of this embodiment, the eNB configures the timing of the measurement gap to ensure that discovery carriers are being transmitted during the measurement gap. The UE may use the synchronization information to adjust the measurement gaps forward or backward in time to better align with the discovery channels of the neighbor cell.

Particular embodiments include methods in a wireless device and a network node. Examples are illustrated in FIGS. 6 and 7, respectively.

Figure 6:
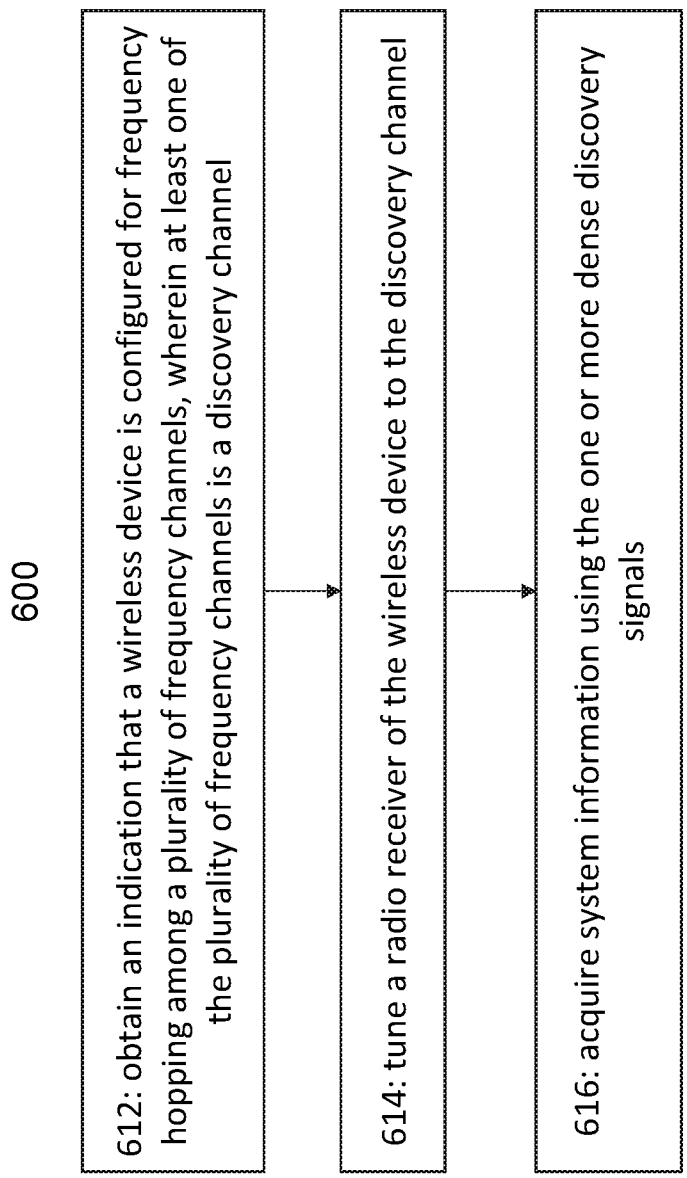
FIG. 6 is a flow diagram of an example method in a user equipment, according to some embodiments.
Figure 7:
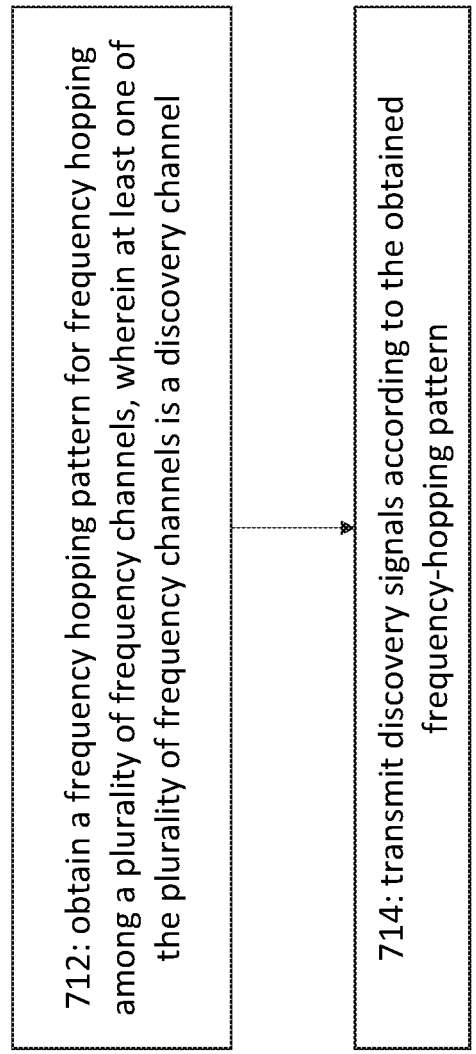
FIG. 7 is a flow diagram of an example method in a network node, according to some embodiments.

FIG. 6 is a flow diagram of an example method in a user equipment, according to some embodiments. Method 600 includes steps for acquiring system information in a frequency-hopping network. In particular embodiments, one or more steps of FIG. 6 may be performed by wireless device 110 of wireless network 100 described with respect to FIG. 1.

The method begins at step 612, where the user equipment obtains an indication that the wireless device is configured for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. For example, wireless device 110 may comprise a NB-IoT device preconfigured for frequency hopping according to a pattern described in a standard, such as a 3GPP standard. In one example, wireless device 110 is configured for frequency hopping within its serving cell. Wireless device 110 may acquire system information for accessing the serving cell.

In another example, wireless device 110 may perform measurements to determine whether a neighboring cell is a handover candidate. The neighbor cell may be configured for frequency hopping. Obtaining the indication that the wireless device is configured for frequency hopping may comprise receiving signaling from the serving cell or the neighbor cell that includes the frequency hopping pattern of the neighbor cell. Wireless device 110 may use the frequency hopping pattern to configure measurement gaps that correlate with transmission of the discovery channels in the neighbor cell. Wireless device 110 may also receive a synchronization offset of the neighbor cell.

In particular embodiments, the one or more discovery signals include at least one of a SS, RS, PBCH, and a SI. For example, the wireless device may comprise a NB-IoT device, and the one or more SS includes at least one of a NPSS and a NSSS, and the at least one PBCH includes a NPBCH. The wireless device may comprise an eMTC device, and the one or more SS includes at least one of PSS and a SSS.

In particular embodiments, at least one discovery signal of the discovery channel is twice as dense as a corresponding discovery signal of the non-discovery channels, as illustrated in FIGS. 5A and 5B, for example. A discovery signal of the non-discovery channel may include one occurrence per frame and the corresponding discovery signal of the discovery channel includes more than one occurrence per frame.

At step 614, the wireless device tunes its radio receiver to the discovery channel. For example, wireless device 110 may tune its radio receiver to a discovery channel Tuning to the discovery channel may comprise multiple attempts. For example, if wireless device 110 cannot acquire system information on a particular frequency channel during a specified dwell time, wireless device 110 may tune to a different frequency channel of the N frequency channels. Wireless device 110 may repeat the process multiple times until wireless device 110 is able to acquire the system information. In some embodiments, under good network conditions wireless device may be able to acquire system information in a non-discovery channel. In poorer conditions, the discovery channel enables wireless device 110 to acquire system information within a specified dwell time.

At step 616, the wireless device acquires system information using the one or more dense discovery signals. For example, wireless device 110 may acquire system information from the dense NPSS illustrated in FIG. 5A. In other examples, wireless device 110 may obtain system information from any suitable synchronization or reference signals.

Modifications, additions, or omissions may be made to method 600 illustrated in FIG. 6. Additionally, one or more steps in method 600 may be performed in parallel or in any suitable order.

FIG. 7 is a flow diagram of an example method in a network node, according to some embodiments. Method 500 includes steps for providing system information in a frequency-hopping network. In particular embodiments, one or more steps of FIG. 7 may be performed by network node 120 of wireless network 100 described with respect to FIG. 1.

The method begins at step 712, where the network node obtains a frequency hopping pattern for frequency hopping among a plurality of frequency channels. At least one of the plurality of frequency channels is a discovery channel. The discovery channel includes one or more dense discovery signals. A dense discovery signal is denser than a corresponding discovery signal included in the non-discovery channels of the plurality of frequency channels. For example, network node 120 may be preconfigured with a particular frequency-hopping pattern with X discovery channels out of N total frequency channels. In some embodiments, network node 120 may obtain the frequency hopping pattern from another network node, such as another network node 120 or control node 320.

In particular embodiments, the one or more discovery signals include at least one of a SS, RS, PBCH, and a SI. For example, the wireless device may comprise a NB-IoT device, and the one or more SS includes at least one of a NPSS and a NSSS, and the at least one PBCH includes a NPBCH. The wireless device may comprise an eMTC device, and the one or more SS includes at least one of PSS and a SSS.

In particular embodiments, at least one discovery signal of the discovery channel is twice as dense as a corresponding discovery signal of the non-discovery channels. A discovery signal of the non-discovery channel may include one occurrence per frame and the corresponding discovery signal of the discovery channel includes more than one occurrence per frame.

At step 714, the network node transmits discovery signals according to the obtained frequency-hopping pattern. For example, network node 120 may transmit discovery signals, such as the discovery signals described with respect to FIG. 5A.

Modifications, additions, or omissions may be made to method 700 illustrated in FIG. 7. Additionally, one or more steps in method 500 may be performed in parallel or in any suitable order.

Figure 8B:
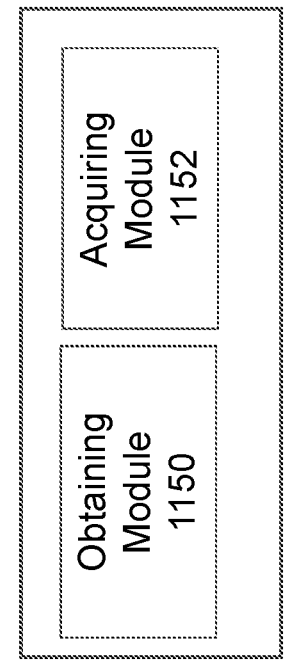
FIG. 8B is a block diagram illustrating example components of a wireless device.
Figure 8A:
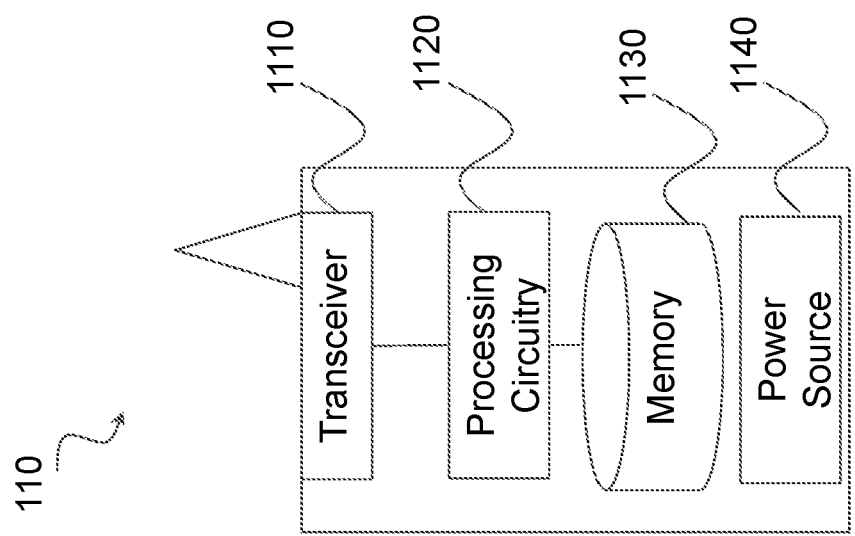
FIG. 8A is a block diagram illustrating an example embodiment of a wireless device.

FIG. 8A is a block diagram illustrating an example embodiment of a wireless device. The wireless device is an example of the wireless devices 110 illustrated in FIG. 1. In particular embodiments, the wireless device is capable of acquiring system information in a frequency-hopping network. The wireless device is capable of obtaining an indication that the wireless device is configured for frequency hopping among a plurality of frequency channels. At least one of the plurality of frequency channels is a discovery channel. The wireless device is further capable of: tuning a radio receiver of the wireless device to the discovery channel, and acquiring system information using the one or more dense discovery signals.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1110, processing circuitry 1120, memory 1130, and power source 1140. In some embodiments, transceiver 1110 facilitates transmitting wireless signals to and receiving wireless signals from wireless network node 120 (e.g., via an antenna), processing circuitry 1120 executes instructions to provide some or all of the functionality described herein as provided by the wireless device, and memory 1130 stores the instructions executed by processing circuitry 1120. Power source 1140 supplies electrical power to one or more of the components of wireless device 110, such as transceiver 1110, processing circuitry 1120, and/or memory 1130.

Processing circuitry 1120 includes any suitable combination of hardware and software implemented in one or more integrated circuits or modules to execute instructions and manipulate data to perform some or all of the described functions of the wireless device. In some embodiments, processing circuitry 1120 may include, for example, one or more computers, one more programmable logic devices, one or more central processing units (CPUs), one or more microprocessors, one or more applications, and/or other logic, and/or any suitable combination of the preceding. Processing circuitry 1120 may include analog and/or digital circuitry configured to perform some or all of the described functions of wireless device 110. For example, processing circuitry 1120 may include resistors, capacitors, inductors, transistors, diodes, and/or any other suitable circuit components.

Memory 1130 is generally operable to store computer executable code and data. Examples of memory 1130 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1140 is generally operable to supply electrical power to the components of wireless device 110. Power source 1140 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 8A) responsible for providing certain aspects of the wireless device's functionality, including any of the functionality described above and/or any additional functionality (including any functionality necessary to support the solution described above).

FIG. 8B is a block diagram illustrating example components of wireless device 110. The components may include obtaining module 1150 and acquiring module 1152.

Obtaining module 1150 may perform the obtaining functions of wireless device 110. For example, obtaining module 1150 may obtain an indication that the wireless device is configured for frequency-hopping among a plurality of frequency channels as described in any of the embodiments or examples above (e.g., step 612 of FIG. 6). In certain embodiments, obtaining module 1150 may include or be included in processing circuitry 1120. In particular embodiments, obtaining module 1150 may communicate with acquiring module 1152.

Acquiring module 1152 may perform the acquiring functions of wireless device 110. For example, acquiring module 1152 may acquire system information from a network node according to any of the examples described above (e.g., steps 614 and 616 of FIG. 4). In certain embodiments, acquiring module 1152 may include or be included in processing circuitry 1120. In particular embodiments, acquiring module 1152 may communicate with obtaining module 1150.

Figure 9B:
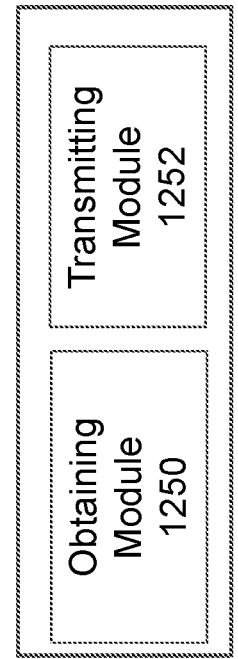
FIG. 9B is a block diagram illustrating example components of a wireless device.
Figure 9A:
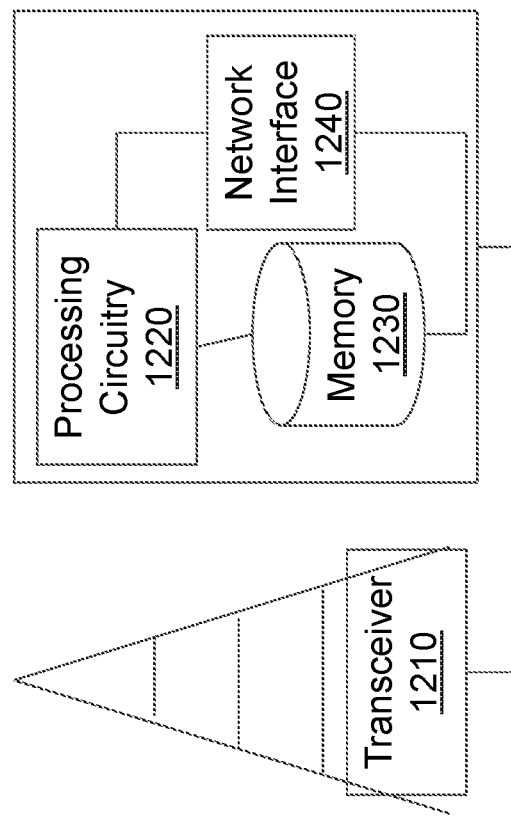
FIG. 9A is a block diagram illustrating an example embodiment of a radio network node.

FIG. 9A is a block diagram illustrating an example embodiment of a network node. The network node is an example of the network node 120 illustrated in FIG. 1. In particular embodiments, the network node is capable of providing system information in a frequency-hopping network. The network node is capable of obtaining a frequency hopping pattern for frequency hopping among a plurality of frequency channels. At least one of the plurality of frequency channels is a discovery channel. The network node is capable of transmitting discovery signals according to the obtained frequency-hopping pattern.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1210, at least one processing circuitry 1220, at least one memory 1230, and at least one network interface 1240. Transceiver 1210 facilitates transmitting wireless signals to and receiving wireless signals from a wireless device, such as wireless devices 110 (e.g., via an antenna); processing circuitry 1220 executes instructions to provide some or all of the functionality described above as being provided by a network node 120; memory 1230 stores the instructions executed by processing circuitry 1220; and network interface 1240 communicates signals to backend network components, such as a gateway, switch, router, Internet, Public Switched Telephone Network (PSTN), controller, and/or other network nodes 120. Processing circuitry 1220 and memory 1230 can be of the same types as described with respect to processing circuitry 1120 and memory 1130 of FIG. 8A above.

In some embodiments, network interface 1240 is communicatively coupled to processing circuitry 1220 and refers to any suitable device operable to receive input for network node 120, send output from network node 120, perform suitable processing of the input or output or both, communicate to other devices, or any combination of the preceding Network interface 1240 includes appropriate hardware (e.g., port, modem, network interface card, etc.) and software, including protocol conversion and data processing capabilities, to communicate through a network.

Other embodiments of network node 120 include additional components (beyond those shown in FIG. 9A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 9B is a block diagram illustrating example components of network node 120. The components may include obtaining module 1250 and transmitting module 1252.

Obtaining module 1250 may perform the obtaining functions of network node 120. For example, obtaining module 1250 may obtain a frequency-hopping configuration as described in any of the embodiments or examples above (e.g., step 712 of FIG. 7). In certain embodiments, obtaining module 1250 may include or be included in processing circuitry 1220. In particular embodiments, obtaining module 1250 may communicate with transmitting module 1252.

Transmitting module 1252 may perform the transmitting functions of network node 120. For example, transmitting module 1252 may transmit system information in a discovery channel according to any of the examples described above (e.g., step 714 of FIG. 7). In certain embodiments, transmitting module 1252 may include or be included in processing circuitry 1220. In particular embodiments, transmitting module 1252 may communicate with obtaining module 1250.

Figure 10B:
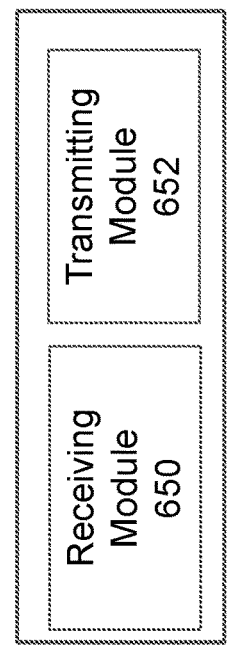
FIG. 10B is a block diagram illustrating example components of a network node.
Figure 10A:
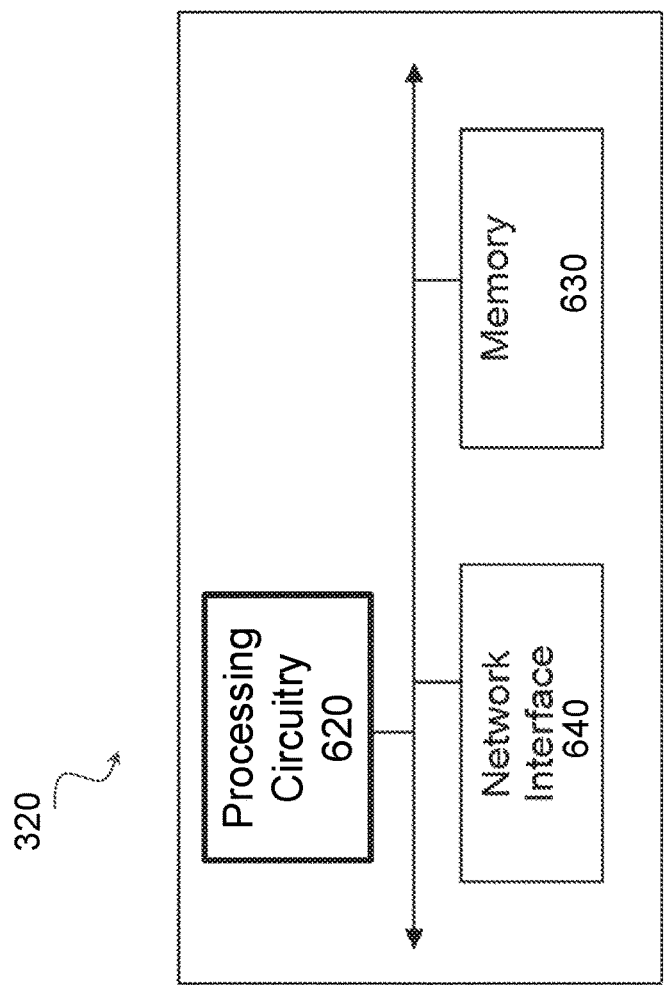
FIG. 10A is a block diagram illustrating an example embodiment of a network node.

FIG. 10A is a block schematic of an example core network node 320, in accordance with certain embodiments. In particular embodiments, the core network node is capable of transmitting a frequency-hopping configuration.

Examples of core network nodes can include an Evolved Serving Mobile Location Centre (E-SMLC), a mobile switching center (MSC), a serving GPRS support node (SGSN), a mobility management entity (MME), a radio network controller (RNC), a base station controller (BSC), an access and mobility management function (AMF), and so on. The core network node includes processing circuitry 620, memory 630, and network interface 640. In some embodiments, processing circuitry 620 executes instructions to provide some or all of the functionality described above as being provided by the network node, memory 630 stores the instructions executed by processing circuitry 620, and network interface 640 communicates signals to any suitable node, such as a gateway, switch, router, Internet, Public Switched Telephone Network (PSTN), network nodes 120, radio network controllers or core network nodes 320, etc.

Processing circuitry 620 may include any suitable combination of hardware and software implemented in one or more modules to execute instructions and manipulate data to perform some or all of the described functions of the core network node. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of the network node may include additional components beyond those shown in FIG. 8A that may be responsible for providing certain aspects of the core network node's functionality, including any of the functionality described above and/or any additional functionality (including any functionality necessary to support the solution described above).

FIG. 8B is a block diagram illustrating example components of core network node 320. The components may include receiving module 650 and transmitting module 652.

Receiving module 650 may perform the receiving functions of core network node 320. For example, receiving module 650 may receive a measurement report as described in any of the embodiments or examples above (e.g., step 514 of FIG. 5). In certain embodiments, receiving module 650 may include or be included in processing circuitry 620. In particular embodiments, receiving module 650 may communicate with transmitting module 652.

Transmitting module 652 may perform the transmitting functions of core network node 320. For example, transmitting module 652 may send network assistance information for location measurements to a wireless device according to any of the examples described above (e.g., step 512 of FIG. 5). In certain embodiments, transmitting module 652 may include or be included in processing circuitry 620. In particular embodiments, transmitting module 652 may communicate with receiving module 650.

Some embodiments of the disclosure may provide one or more technical advantages. Some embodiments may benefit from some, none, or all of these advantages. Other technical advantages may be readily ascertained by one of ordinary skill in the art. For example, in some embodiments the initial cell acquisition process may be faster, leading to quicker connection to the network. UE power consumption may be reduced in some embodiments. By limiting the number of hops on which the SS/RS density is increased, the system overhead may not increase significantly.

Although this disclosure has been described in terms of certain embodiments, alterations and permutations of the embodiments will be apparent to those skilled in the art. Although some embodiments have been described with reference to certain radio access technologies, any suitable radio access technology (RAT) or combination of radio access technologies may be used, such as long term evolution (LTE), LTE-Advanced, NR, UMTS, HSPA, GSM, cdma2000, WiMax, WiFi, etc. Accordingly, the above description of the embodiments does not constrain this disclosure. Other changes, substitutions, and alterations are possible without departing from the scope of this disclosure.

ABBREVIATIONS

3GPP 3rd Generation Partnership Project
AS Access Stratum
CA Carrier Aggregation
CC Component Carrier
CN Core Network
EIRP Effective Isotropic Radiated Power
eMTC enhanced Machine Type Communications
eMTC-U enhanced Machine Type Communications for Unlicensed Band
eNB Evolved Node B
eNodeB Evolved Node B
E-SMLC Evolved Serving Mobile Location Center
FeMTC Further enhanced MTC
FDD Frequency Division Duplex
GNSS Global Navigation Satellite System
ID Identifier
ISM Industrial, Scientific and Medical
FH Frequency-hopping
IoT Internet of Things
LBT Listen Before Talk
LPP LTE Positioning Protocol
LTE Long-Term Evolution
MF MuLTEfire
MME Mobility Management Entity
MSC Mobile Switching Center MTC Machine Type Communication
NAS Non Access Stratum
NB-IoT NarrowBand-IoT
NB-IoT-U Narrow-band Internet of Things for Unlicensed Band
NSSS Narrowband Secondary Synchronization Signal
NPSS Narrowband Primary Synchronization Signal
NR New Radio
NW Network
OTDOA Observed Time Difference of Arrival
PBCH Physical Broadcast Channel
PCID Physical Cell Identity
PCC Primary Component Carrier
PCell Primary Cell
PDU Protocol Data Unit
PGW Packet Data Network Gateway
PRB Physical Resource Block
PSD Power Spectral Density
RAT Radio Access Technology
RAN Radio Access Network
RRC Radio Resource Control
RSRP Reference Signal Received Power
RSRQ Reference Signal Received Quality
RSTD Reference Signal Time Difference
SCC Secondary Component Carrier
SCell Secondary Cell
SFN System Frame Number
SGW Serving Gateway
SLA Service Level Agreement
SRB Signaling Radio Bearer
TDD Time Division Duplex
TDOA Time Difference Of Arrival
TOA Time Of Arrival
UE User Equipment
UMTS Universal Mobile Telecommunications System
UTDOA Uplink Time Difference of Arrival

The invention claimed is:

1. A method for use in a wireless device of acquiring system information in a frequency-hopping network, the method comprising:
obtaining an indication that the wireless device is configured for frequency hopping among a plurality of frequency channels, wherein at least one of the plurality of frequency channels is a discovery channel, and the discovery channel includes one or more dense discovery signals wherein a dense discovery signal is denser than a corresponding discovery signal included in the non-discovery channels of the plurality of frequency channels;
tuning a radio receiver of the wireless device to the discovery channel; and
acquiring system information using the one or more dense discovery signals,
wherein the one or more discovery signals include at least one of a synchronization signal (SS), reference signal (RS), physical broadcast channel (PBCH), and a system information (SI), the wireless device comprises a narrowband Internet-of-Things (NB-IoT) device, and the one or more SS includes at least one of a narrowband primary synchronization signal (NPSS) and a narrowband secondary synchronization signal (NSSS), and the at least one PBCH includes a narrowband physical broadcast channel (NPBCH).

2. The method of claim 1, wherein obtaining the indication that the wireless device is configured for frequency hopping comprises the wireless device being preconfigured for frequency hopping.

3. The method of claim 1, wherein obtaining the indication that the wireless device is configured for frequency hopping comprises receiving an indication of a frequency hopping pattern of a neighbor cell, wherein the frequency hopping pattern of the neighbor cell includes at least one discovery channel;
the method further comprises configuring one or more measurement gaps that coincide with the at least one discovery channel of the neighbor cell; and
wherein acquiring system information using the one or more dense discovery signals comprises measuring a signal quality of at least one of the one or more dense discovery signals of the neighbor cell during one of the one or more measurement gaps.

4. The method of claim 3, further comprising receiving a synchronization offset of the neighbor cell; and
wherein configuring the one or more measurement gaps is based on the received synchronization offset of the neighbor cell.

5. The wireless device of claim 1, wherein at least one discovery signal of the discovery channel is twice as dense as a corresponding discovery signal of the non-discovery channels.

6. The wireless device of claim 1, wherein a discovery signal of the non-discovery channel includes one occurrence per frame and the corresponding discovery signal of the discovery channel includes more than one occurrence per frame.

7. A wireless device capable of acquiring system information in a frequency-hopping network, the wireless device comprising processing circuitry operable to:
obtain an indication that the wireless device is configured for frequency hopping among a plurality of frequency channels, wherein at least one of the plurality of frequency channels is a discovery channel, and the discovery channel includes one or more dense discovery signals wherein a dense discovery signal is denser than a corresponding discovery signal included in the non-discovery channels of the plurality of frequency channels;
tune a radio receiver of the wireless device to the discovery channel; and
acquire system information using the one or more dense discovery signals,
wherein the one or more discovery signals include at least one of a synchronization signal (SS), reference signal (RS), physical broadcast channel (PBCH), and a system information (SI), the wireless device comprises a narrowband Internet-of-Things (NB-IoT) device, and the one or more SS includes at least one of a narrowband primary synchronization signal (NPSS) and a narrowband secondary synchronization signal (NSSS), and the at least one PBCH includes a narrowband physical broadcast channel (NPBCH).

8. The wireless device of claim 7, wherein the processing circuitry is operable to obtain the indication that the wireless device is configured for frequency hopping by obtaining a preconfiguration of the wireless device for frequency hopping.

9. The wireless device of claim 7, wherein the processing circuitry is operable to obtain the indication that the wireless device is configured for frequency hopping by receiving an indication of a frequency hopping pattern of a neighbor cell, wherein the frequency hopping pattern of the neighbor cell includes at least one discovery channel;

the processing circuitry is further operable to configure one or more measurement gaps that coincide with the at least one discovery channel of the neighbor cell; and the processing circuitry is operable to acquire system information using the one or more dense discovery signals by measuring a signal quality of at least one of the one or more dense discovery signals of the neighbor cell during one of the one or more measurement gaps.

10. The wireless device of claim 9, the processing circuitry further operable to receive a synchronization offset of the neighbor cell; and the processing circuitry is operable to configure the one or more measurement gaps based on the received synchronization offset of the neighbor cell.

11. A network node capable of providing system information in a frequency-hopping network, the network node comprising processing circuitry operable to:

obtain a frequency hopping pattern for frequency hopping among a plurality of frequency channels, wherein at least one of the plurality of frequency channels is a discovery channel, and the discovery channel includes one or more dense discovery signals wherein a dense discovery signal is denser than a corresponding discovery signal included in the non-discovery channels of the plurality of frequency channels; and transmit discovery signals according to the obtained frequency-hopping pattern, wherein the processing circuitry further operable to transmit the frequency hopping pattern to a wireless device, the processing circuitry is operable to transmit the frequency hopping pattern by transmitting at least one of a cell identity and a network identity, and the one or more SS includes at least one of a narrowband primary synchronization signal (NPSS) and a narrowband secondary synchronization signal (NSSS), and the at least one PBCH includes a narrowband physical broadcast channel (NPBCH).

12. The method of claim 11, the processing circuitry further operable to transmit a synchronization offset of a neighbor cell to the wireless device.

13. The method of claim 11, wherein the one or more discovery signals include at least one of a synchronization signal (SS), reference signal (RS), physical broadcast channel (PBCH), and a system information (SI).

14. The method of claim 11, wherein the one or more SS includes at least one of a primary synchronization signal (PSS) and a secondary synchronization signal (SSS).

15. The method of claim 11, wherein at least one discovery signal of the discovery channel is twice as dense as a corresponding discovery signal of the non-discovery channels.

16. The method of claim 11, wherein a discovery signal of the non-discovery channel includes one occurrence per frame and the corresponding discovery signal of the discovery channel includes more than one occurrence per frame.

* * * * *